United States Patent
Adedeji

(12) United States Patent
(10) Patent No.: US 6,376,606 B1
(45) Date of Patent: *Apr. 23, 2002

(54) SEMI-TRANSPARENT BLENDS OF POLYPHENYLENE ETHER AND STYRENIC COPOLYMERS

(75) Inventor: Adeyinka Adedeji, Albany, NY (US)

(73) Assignee: General Electric Co., Pittsfield, MA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/003,452

(22) Filed: Jan. 6, 1998

(51) Int. Cl.⁷ .............................. C08L 71/12; C08L 53/02
(52) U.S. Cl. .......................................... 525/71; 524/505
(58) Field of Search ......................... 525/71, 904, 905, 525/88, 926; 524/505

(56) References Cited

U.S. PATENT DOCUMENTS

| | | |
|---|---|---|
| 3,257,357 A | 6/1966 | Stamatoff |
| 3,257,358 A | 6/1966 | Stamatoff |
| 3,306,874 A | 2/1967 | Hay |
| 3,306,875 A | 2/1967 | Hay |
| 3,383,435 A | 5/1968 | Clzck ........................ 525/905 |
| 3,639,508 A | 2/1972 | Kambour |
| 3,887,647 A * | 6/1975 | Yonemitsu et al. ........... 525/71 |
| 4,097,550 A | 6/1978 | Haaf et al. ..................... 525/71 |
| 4,101,503 A | 7/1978 | Cooper et al. ............... 525/905 |
| 4,101,504 A | 7/1978 | Cooper et al. ............... 525/68 |
| 4,101,505 A | 7/1978 | Cooper et al. ................ 525/68 |
| 4,113,800 A | 9/1978 | Lee, Jr. ........................ 525/89 |
| 4,116,917 A | 9/1978 | Eckert |
| 4,128,602 A | 12/1978 | Katchman et al. ............ 525/68 |
| 4,139,574 A | 2/1979 | Cooper et al. ............... 525/905 |
| 4,154,712 A | 5/1979 | Lee, Jr. ........................ 525/93 |
| 4,167,507 A | 9/1979 | Haaf |
| 4,863,997 A * | 9/1989 | Shibuya et al. ............. 524/505 |
| 4,913,971 A | 4/1990 | Beck et al. |
| 4,914,248 A | 4/1990 | Kitagawa et al. |
| 4,918,145 A | 4/1990 | Dougherty et al. |
| 4,939,207 A | 7/1990 | Fasulo et al. |
| 4,948,832 A | 8/1990 | Ostermayer et al. |
| 6,037,410 A * | 3/2000 | Adedeji et al. ........... 525/92 D |

FOREIGN PATENT DOCUMENTS

| | | |
|---|---|---|
| EP | 0 048 397 A | 3/1982 |
| EP | 0 367 188 A | 5/1990 |
| EP | 0 550 210 A | 7/1993 |

* cited by examiner

Primary Examiner—James J. Seidleck
Assistant Examiner—Olga Asinovsky

(57) ABSTRACT

The invention relates to process for the manufacture of a semi-transparent thermoplastic composition of a polyphenylene ether resin and a styrenic block copolymer that is a linear di-block block copolymer, a tri-block block copolymer, a radial block copolymer, and/or a tapered block copolymer. The compositions made by the process of the invention may also contain crystal polystyrene resin and exhibit enhanced physical properties, especially ductility.

The invention also relates to articles formed out of the compositions made by the process of the invention.

11 Claims, No Drawings

SEMI-TRANSPARENT BLENDS OF POLYPHENYLENE ETHER AND STYRENIC COPOLYMERS

CROSS-REFERENCE TO RELATED APPLICATIONS

Not applicable.

FEDERALLY SPONSORED RESEARCH

Not applicable.

BACKGROUND OF THE INVENTION

1. Field of the Invention

The invention relates to a process for the manufacture of a semi-transparent thermoplastic composition of a polyphenylene ether resin and a styrenic block copolymer wherein the processes comprises melt-mixing the polyphenylene ether resin in a powder form with the styrenic block copolymer and wherein the styrene-butadiene copolymer is a linear di-block copolymer, a tri-block copolymer, or a mixture of di-block and tri-block copolymers. The composition of the invention may also contain polystyrene resin.

The invention also relates to articles formed out of the compositions made by the process of the invention.

2. Brief Description of the Related Art

In the food handling area, clamshell styled containers having an opaque bottom and a see-through top are in great demand for prepared foods. Busy consumers desire to purchase entrees at a local store or restaurant and take the meal home for the family meal. Reheating the food in a microwave oven is often the method of choice because of convenience and time and consequently the clamshell styled containers must have sufficient heat resistance to withstand steam and hot greases and oils. Additionally, the containers must have sufficient ductility to not break on handling and use by both the food preparer and the consumer.

In order to achieve great penetration into the clamshell styled container market, a resin needs to be of low cost and have outstanding processability, have sufficient transparency for food to be seen through the container top, have sufficient ductility to withstand breakage, and be able to resist hot greases and oils from foods on heating in a microwave oven.

Polystyrene resins are widely used thermoplastic resins because of their low cost and easy processability. These resins are available as homopolymer polystyrene (often called crystal polystyrene), as block copolymers with elastomeric materials (e.g., S-B-S, S-(EB)-S, S-EP copolymers), and as impact modified graft resins with polybutadiene resin (HIPS). Within these categories, there are flame-retardant, abrasion resistant, super-tough, UV-resistant, expandable, and environmental stress crack resistant grades that enable these resins to be used in a wide variety of everyday consumer goods such as toys, packaging, housewares, construction materials, automobile parts, and disposables.

Polystyrene resins are currently used in many clamshell designed containers, both in foamed opaque clamshells and in containers having see-through lids. Unfortunately, the properties of the various polystyrene resins are insufficient albeit for different reasons for great penetration into the market for clamshell styled containers having an opaque bottom and a see-through top. For example, crystal polystyrene is insufficient in ductility although acceptable in cost, processing, and transparency for the top. Addition of rubbery styrenic copolymers (S-B-S, S-EB-S) to crystal polystyrene improves the ductility but at the expense of the necessary transparency. High impact polystyrene (i.e., HIPS) has good impact strength but is not transparent. Polystyrene-butadiene copolymers containing over fifty percent styrene exhibit good ductility, cost, and transparency but are insufficient in heat resistance.

Poly(phenylene ether) resins (referred to hereafter as "PPE") are commercially attractive materials because of their unique combination of physical, chemical, and electrical properties. Commercially, most PPE are sold as blends with predominantly high impact polystyrene resins. PPE are miscible with polystyrene resins in all proportions and because of the very high glass transition temperatures of PPE, the blends of PPE with polystyrene resins possess higher heat resistance than that of the polystyrene resins alone. Moreover, the combination of PPE with high impact polystyrene resins results in additional overall properties such as high flow and ductility, however, such blends are not transparent or even semi-transparent. Examples of such blends can be found in U.S. Pat. Nos. 3,383,435; 4,097,550; 4,113,800; 4,101,503, 4,101,504; 4,101,505; 4,128,602; 4,139,574; and 4,154,712 among others. The properties of these blends can be further enhanced by the addition of various additives such as impact modifiers, flame retardants, light stabilizers, processing stabilizers, heat stabilizers, antioxidants and fillers but none of these additives results in transparent or semi-transparent compositions that would be useful for the aforementioned clamshell styled containers having a see-through top. Moreover, the melt blending of styrene-butadiene copolymer, wherein the styrene content in the copolymer is at least 50% by weight based on the weight of the copolymer, with pellets of PPE or PPE blended with high impact polystyrene results in degradation of the styrene-butadiene copolymer and sheet made the composition has an unacceptable surface quality, including unacceptable gels.

It is therefore apparent there continues to be a need for improved compositions as well as processes to manufacture compositions containing polystyrene resins that have acceptable ductility, heat resistance, and transparency for use in clamshell styled containers having a see-through top.

SUMMARY OF THE INVENTION

The needs discussed above have been generally satisfied by the discovery of a process for the manufacture of a semi-transparent thermoplastic composition containing:

a) a polyphenylene ether resin, and b) a styrene-butadiene copolymer, wherein the styrene content in the copolymer is at least 50% by weight based on the weight of the copolymer, and wherein the butadiene block length and structure results in butadiene domains that are smaller than the wavelength of visible light;

wherein the process comprises melt-mixing the polyphenylene ether resin in a powder form with the styrenic block copolymer and wherein the styrene-butadiene copolymer is a linear di-block block copolymer, a tri-block block copolymer, or a mixture of di-block and tri-block copolymers.

The styrene-butadiene copolymer may also be a tapered di-block or tri-block copolymer as well as various mixtures of any of the foregoing copolymers. The process may optionally include melt mixing crystal polystyrene with the polyphenylene ether resin, and styrene-butadiene copolymer.

The description which follows provides further details regarding this invention.

DESCRIPTION OF THE DRAWINGS

Not applicable.

DETAILED DESCRIPTION OF THE INVENTION

Polyphenylene ether resins are a well known class of compounds sometimes referred to as polyphenylene oxide resins. Examples of suitable PPE and processes for their preparation can be found in, for example, U.S. Pat. Nos. 3,306,874; 3,306,875; 3,257,357; and 3,257,358. Compositions of the present invention will encompass homopolymers, copolymers and graft copolymers obtained by the oxidative coupling of phenolic compounds. The preferred PPE used in compositions of the present invention are derived from 2,6-dimethyl phenol. Also contemplated are PPE copolymers derived from 2,6-dimethyl phenol and 2,3,6-trimethyl phenol.

Useful PPE include poly(2,6-dimethyl-1,4-phenylene ether) resin having an intrinsic viscosity (I.V.) of between about 0.10 and about 0.60 dl/g as measured in toluene at 25° C. and a concentration of 0.6 gram per 100 ml. In a preferred embodiment of the invention, the PPE have an intrinsic viscosity (I.V.) of between about 0.25 and about 0.35 dl/g as measured in toluene at 25° C. and a concentration of 0.6 gram per 100 ml.

The present compositions also contain, as component B, a styrene-butadiene copolymer, wherein the styrene content in the copolymer is at least 50% by weight based on the weight of the copolymer, and wherein the butadiene block length and structure results in butadiene domains that are smaller than the wavelength of visible light. When the butadiene block length and structure results in butadiene domains that are larger than the wavelength of visible light, the transparency of the compositions is unacceptable.

The styrene-butadiene copolymer may be a linear di-block, and/or a tri-block copolymer and may also be a tapered block copolymer as well as various mixtures of any of the foregoing copolymers. The composition may also contain crystal polystyrene.

These block copolymers are derived from vinyl aromatic monomers and conjugated diene monomers and are also well known in the art. The preferred vinyl aromatic monomer is styrene and the preferred conjugated diene monomer is 1,3-butadiene. Copolymers of this type generally comprise from about 60 to about 95 percent by weight polymerized vinyl aromatic monomer and about 40 to about 5 percent by weight polymerized conjugated diene monomer.

The copolymer of Component B is linear block copolymer, and generally comprises blocks of $A^1$ and $B^1$, wherein $A^1$ is a polymerized monovinyl-substituted aromatic compound monomer block, and $B^1$ is a hydrogenated, partially hydrogenated, or non-hydrogenated block derived from at least one polymerized conjugated diene. A preferred monovinyl-substituted aromatic compound monomer is styrene and a preferred conjugated diene is 1,3-butadiene.

The copolymer may be a pure block copolymer or may be a tapered block copolymer. Those of ordinary skill in the polymer arts understand the concept of "tapering". Furthermore, techniques for achieving tapered polymers or copolymers are well-known in the art. Examples of references which relate to tapered polymers are U.S. Pat. Nos. 4,948,832; 4,939,207; 4,918,145; 4,914,248; 4,913,971; and 4,116,917, all of which are incorporated herein by reference.

In one embodiment of the invention, the weight-average molecular weight of the entire copolymer is preferably from about 90,000 to about 270,000, and most preferably, in the range of about 110,000 to about 150,000.

The vinyl aromatic polymer of the tapered block copolymer is preferably in a form which includes both random and block structural units, with the weight ratio of random to block usually being in the range of about 1.5:1 to about 4:1, and more preferably, within the range of about 2.5:1 to about 3:1. Some of the suitable materials of this type contain a block of the vinyl aromatic polymer having a molecular weight of about 10,000 to about 30,000, followed by a block of the polymerized conjugated diene having a molecular weight of about 25,000 to about 65,000, which itself is linked to a random block of vinyl aromatic-conjugated diene polymer (for example, a random block of styrene-butadiene), having a molecular weight of about 30,000 to about 50,000. The random block may be attached at its opposite end to another vinyl aromatic polymeric block, usually having a molecular weight of about 30,000 to about 50,000.

In some preferred embodiments, the Al block of the block copolymer is derived from a monomer selected from the group consisting of styrene, alpha-methyl styrene, para-methyl styrene, vinyl toluene, vinyl xylene, and combinations of such monomers. The $B^1$ block is preferably derived from a monomer selected from the group consisting of butadiene, isoprene, ethylene, butylene, 1,3-pentadiene, 2,3-dimethyl butadiene, and combinations thereof. It is also possible that the tapered block copolymer can contain more than one type of $A^1$ and/or $B^1$ block.

Tapered linear styrene-butadiene-styrene (SBS) "tri-block" copolymers falling within the molecular weight ranges described above are especially suitable for use in the invention. An example of such a material is FINACLEAR™ 520, a commercially available product available from Fina Oil and Chemical Company.

In some embodiments, compositions of the present invention are further enhanced by the inclusion of homopolystyrene resin, commonly called crystal polystyrene resin. When used, the level ranged from about 1% by weight to about 70% by weight, preferably from about 1% by weight to about 60% by weight, based on the weight of the entire composition.

In some preferred embodiments, it should be clear that the thermoplastic compositions made by the process of the present invention are substantially free of other thermoplastic resins with the exception of the optional homopolystyrene resin. The other thermoplastic resins that the compositions should be substantially free of include polyamide resins, high impact polystyrene resins, polyester resins, polycarbonate resins, polysulfone resins, polyarylate resins, polyphenylene sulfide resins, and polyetherimide resins as well as various mixtures of other thermoplastic resins. By "substantially free" is meant that the compositions contain less that 5% by weight, preferably less than 3% by weight, more preferably less that 1% by weight, and most preferable essentially none of the other thermoplastic resins, wherein all percentages by weight are based upon the entire weight of the composition. It should also be clear that the thermoplastic compositions made by the process of the present invention are free of other thermoplastic resins with the exception of the optional homopolystyrene resin.

The thermoplastic composition of the invention may comprise any of the following additives: stabilizers, dyes, and pigments.

A suitable level of the various components depends on several factors, such as the end-use of the product, the level of impact strength desired, and the particular type and characteristics of other components which are present.

Usually, about 5% by weight to about 70% by weight of PPE is present, based on the weight of the entire composition. In one preferred embodiment, the level is about 5% by weight to about 30% by weight, wherein all weights are based upon the weight of the entire composition. In another preferred embodiment, the level of PPE that is present in the compositions is that which results in a composition having a heat distortion temperature of at least about 170° F., preferably at least about 180° F. when measured at 264 psi under the test conditions described within ASTM D 648.

The compositions of the present invention can be prepared by a variety of methods involving intimate admixing of the materials with any additional additives desired in the formulation. A preferred procedure includes melt blending, although solution blending is also possible. Because of the availability of melt blending equipment in commercial polymer processing facilities, melt processing procedures are generally preferred. Examples of equipment used in such melt compounding methods include: co-rotating and counter-rotating extruders, single screw extruders, disc-pack processors and various other types of extrusion equipment. The temperature of the melt in the present process is preferably minimized in order to avoid excessive degradation and gel formation in the styrene-butadiene copolymer. It is desirable to maintain the melt temperature between about 200° C. and about 330° C., although higher temperatures can be used provided that the residence time of the resin in the processing equipment is kept short. In some instances, the compounded material exits the extruder through small exit holes in a die and the resulting strands of molten resin are cooled by passing the strands through a water bath. The cooled strands can be chopped into small pellets for packaging and further handling.

The physical form and size of the PPE is important to obtaining a smooth surface composition with a low gel content. As the PPE particle size increases, the shear heating in the compounding equipment is increased and the styrene-butadiene copolymer degrades and becomes cross-linked. The cross-linked material may appear as unacceptable gels on the surface of an extruded sheet of the composition. In order to minimize the formation of gels, the use PPE powder is preferred in process of the present invention. By powder is meant a PPE particle size wherein at least 80 weight percent of the PPE will pass through a 3000 micron sieve, more preferably at least 90 weight percent will pass through a 2000 micron sieve. Typically, the PPE used in the present invention is in the form as collected after precipitation with a non-solvent, e.g., methanol, from the reaction polymerization medium, e.g., toluene. Larger PPE particles may be utilized with acceptable results when homopolystyrene resin is also present in the process.

It should be clear that thermoplastic compositions made by the process described herein are another embodiment of the present invention. It should also be clear that articles formed out of the thermoplastic compositions described herein are another embodiment of the present invention.

All patents cited are incorporated herein by reference.

The invention will be further illustrated by the following examples.

EXPERIMENTAL

Illustrative compositions of the present invention generally contain the following materials:

PPE: a poly(2,6-dimethyl-1,4-phenylene ether) with an intrinsic viscosity of 30 ml/g as measured in toluene at 25° C. and a concentration of 0.6 gram per 100 ml;

Finaclear 520: a tapered block copolymer of polystyrene and polybutadiene and having an overall styrene content of about 75% by weight and commercially available from Fina Oil Company;

PS: crystal polystyrene resin available from BASF and Chevron as grades 1800P and EB3300, respectively; and HIPS: high impact polystyrene available from Chevron as grade MA5350, Valtra 7023.

Exemplary conditions and procedures used in the manufacture of compositions of the present invention are as follows. The ingredients are compounded in a twin-screw extruder with temperature settings over the length of the extruder between about 280 and about 310° C. The screw speed is about 300 rpm, the throughput about 10 kilograms per hour. All ingredients are generally fed at the throat of the extruder. The strands coming from the extruder are pelletized and dried for about 3 hours at about 110° C. The dried pellets are injection molded into standard ASTM test specimens for measurement of physical properties.

Compositions of crystal polystyrene as well as compositions of PPE and crystal polystyrene exhibit unacceptably poor ductility. Compositions of PPE and high impact polystyrene (i.e., HIPS) lack the desired clarity and/or exhibit unacceptably low heat distortion temperatures. Addition of PPE to a tapered block copolymer of polystyrene and polybutadiene and having an overall styrene content of about 75% by weight lead to an outstanding balance of properties, including the desired degree of transparency for food to be observed through a clam-shell top. The clarity and balance of balance of properties is unexpected given the properties of blends of PPE with HIPS or crystal polystyrene. Crystal polystyrene may be added to the compositions of PPE and radial block copolymer to further refine the properties (such as rigidity) and cost of the composition.

The preceding examples illustrate specific embodiments of the invention and are not intended to limit its scope. It should be clear that the present invention includes articles from the compositions as described herein. Additional embodiments and advantages within the scope of the claimed invention will be apparent to one or ordinary skill in the art.

I claim:

1. A process for the manufacture of a thermoplastic composition, comprising:

a polyphenylene ether resin powder wherein at least 80 weight percent of the polyphenylene ether resin powder will pass through a 3000 micron sieve, and a styrene-butadiene block copolymer, wherein the styrene content in the block copolymer is at least 50% by weight based on the weight of the copolymer, and wherein the butadiene block length and structure results in butadiene domains that are smaller than the wavelength of visible light, wherein the composition is substantially free of thermoplastic resins selected from the group consisting of polyamide resins, high impact polystyrene resins, polyester resins, polycarbonate resins, polysulfone resins, polyarylate resins, polyphenylene sulfide resins, and polyetherimide resins; and wherein said process comprises melt-mixing the polyphenylene ether resin powder with the styrene-butadiene block copolymer; and wherein the styrene-butadiene block copolymer is a linear di-block block copolymer, a linear tri-block block copolymer, or a mixture of linear di-block and linear tri-block block copolymers.

2. The process of claim 1, wherein the styrene content in the styrene-butadiene block copolymer is between about 65% and 80% by weight based on the weight of the block copolymer.

3. The process of claim 1, wherein the polyphenylene ether resin is present from about 5 to about 70 percent by weight based upon the weight of the entire composition.

4. The process of claim 1, wherein at least 90 weight percent of the polyphenylene ether resin in a powder form will pass through a 2000 micron sieve.

5. The process of claim 1 wherein the composition has a heat distortion temperature of at least about 170° F. when measured at 264 psi under the test conditions described within ASTM D 648.

6. The process of claim 1, wherein the styrene-butadiene block copolymer is a tapered block copolymer.

7. The process of claim 1, wherein the composition further comprises an additive selected from the group consisting of stabilizers, dyes, pigments, and mixtures thereof.

8. The process of claim 1, wherein the composition comprises less than 5% by weight of said thermoplastic resins based on the entire weight of the composition.

9. The process of claim 8, wherein the composition comprises less than 3% by weight of said thermoplastic resins based on the entire weight of the composition.

10. The process of claim 9, wherein the composition comprises less than 1% by weight of said thermoplastic resins based on the entire weight of the composition.

11. The process of claim 1, wherein the composition further comprises a crystal polystyrene.

* * * * *